United States Patent [19]
Dery

[11] 4,244,774
[45] Jan. 13, 1981

[54] APPARATUS TO APPLY PRE-GLUED STRIPS OF RESISTIVE MATERIAL TO A CAR REAR WINDOW

[76] Inventor: Normand Dery, 190 8e Ave. Sud, Sherbrooke, Québec, Canada

[21] Appl. No.: 72,609

[22] Filed: Sep. 5, 1979

Related U.S. Application Data

[60] Continuation-in-part of Ser. No. 843,364, Oct. 19, 1977, abandoned, which is a division of Ser. No. 668,743, Mar. 19, 1976, Pat. No. 4,065,848.

[30] Foreign Application Priority Data

Mar. 15, 1976 [CA] Canada .................... 247966

[51] Int. Cl.3 .................... B32B 31/04; B44C 7/00

[52] U.S. Cl. .................... 156/574; 156/378; 156/584; 219/203

[58] Field of Search .................... 156/64, 71, 233, 378, 156/523, 526, 556, 574, 577, 584; 338/308, 314, 212; 26/611; 219/203, 542; 33/403, 430, 443

[56] References Cited

U.S. PATENT DOCUMENTS

| | | | |
|---|---|---|---|
| 2,506,426 | 5/1950 | Larsen | 33/430 |
| 2,904,206 | 9/1959 | Bertschinger | 156/577 |
| 3,700,496 | 10/1972 | Plumat | 219/203 X |
| 3,705,047 | 12/1972 | Marriott | 219/203 X |
| 3,736,404 | 5/1973 | Eisler | 219/203 |
| 3,757,087 | 9/1973 | Bernard | 219/203 X |
| 3,829,347 | 8/1974 | Honea | 156/577 |
| 4,022,651 | 5/1977 | Larkins et al. | 156/577 |
| 4,026,757 | 5/1977 | Crawford | 156/577 X |

*Primary Examiner*—Michael G. Wityshyn
*Attorney, Agent, or Firm*—Larson, Taylor and Hinds

[57] ABSTRACT

An apparatus for the installation of a defroster of the resistive type on the rear window of a completely assembled motor vehicle. The defroster comprises heating conductors in the form of thin pre-glued strips of solid copper or copper alloy applied to the inside surface of the rear window in a first direction with two spaced apart connecting conductors in the traverse direction. The apparatus is used for applying the various parallel heating conductors to the inside surface of the window. It comprises a guide member temporarily retained against the inside surface of the rear window, and a carrier having a head which receives and applies the strips of pre-glued copper conductor to the rear window, a base adapted to roll along the guiding edge defined by the guide member, and an upright shaft for supporting the head affixed, adjustable distance away from the base. The head is free to rotate around the axis of the shaft at least within limits, and it is also pivotable about an axis which is perpendicular to the shaft and parallel to the window engaging member of the head.

20 Claims, 16 Drawing Figures

APPARATUS TO APPLY PRE-GLUED STRIPS OF RESISTIVE MATERIAL TO A CAR REAR WINDOW

This is a continuation-in-part of application Ser. No. 843,364 filed on Oct. 19, 1977, now abandoned, which is a division of Ser. No. 668,743 filed on Mar. 19, 1976, now U.S. Pat. No. 4,065,848.

This invention relates to rear window defrosters of the resistive conductor type which are installed on the inside surface of a motor vehicle's rear window for increasing the temperature of the rear window in order to clear same of fog or frost. This invention is more particularly concerned with tools and equipment used for effecting installation of the particular resistive type defrosters which are disclosed in applicant's U.S. Pat. No. 4,065,848 issued on Jan. 3, 1978.

BACKGROUND OF THE INVENTION

This particular resistive defroster comprises a plurality of parallel, equally spaced apart heating conductors secured to the inside surface of the car's rear window, with two widely spaced apart connecting conductors which extend generally transversely of the heating conductors. Each heating conductor is a thin pre-glued strip of suitable metal such as copper or an alloy thereof. The strip is of uniform rectangular cross-section whose width greatly exceeds its thickness. One wide surface of the strip is covered with a layer of thermosetting adhesive, and prior to installation the free surface of adhesive is covered with a protective film; thus the strip of conductor may be kept in roll form. The protective film however must be removed from the pre-glued strip just prior to its application to a rear window.

A variety of devices and apparatus have been proposed for laying pre-glued conductors or tapes to planar surfaces, such as those disclosed in U.S. Pat. Nos. 3,829,347 issued on Aug. 13, 1974 and 4,022,651 dated May 10, 1977, but none of them is adequate for use in the confined area found in most modern motor cars and for use when applying a thin pre-glued strip to a curved and slanted window.

Accordingly, an object of the invention is to provide an apparatus which enables an operator to apply the parallel, spaced apart heating conductors to a rear window in an assembled motor car or truck.

An other object is to provide a strip applicator which is convenient to use in all makes and models of cars and trucks, and which will enable the operator to properly align and dispose the various heating conductors with ease and in the shortest time possible.

It is a further object of this invention to provide a strip applicator which is easy to use with only one hand, which automatically removes the protective film a very short distance upstream from the point of strip contact with the window, and which will facilitate application of the ends of each heating conductor close to the side edges of the window.

SUMMARY OF THE INVENTION

It has been found that a suitable heating conductor applicator may be constructed using a carrier comprising a head, a base and an upright shaft extending upwardly from the base. The base comprises a cross-bar and two spaced apart wheels adapted to roll along the straight edge and the shaft is preferably straight, of constant cross-section and has a plurality of equally spaced apart index marks along its length. The head is pivotably supported to the shaft and it comprises locking means for releasably securing the head to the shaft at predetermined positions therealong corresponding to the index marks. The head comprises a coupling through which the shaft projects, and a window engaging member pivotally supported to the coupling around a first axis which is essentially perpendicular to the axis of the shaft and parallel to the window. The window engaging member comprises a sufficiently wide and relatively long pressure surface for pressing the strip against the inside surface of the rear window. The window engaging member also comprising a groove for receiving the strip for guiding same toward the inside surface of the rear window. The invention provides numerous features and improvements to such applicators as will be described hereinafter.

The invention also provides a guide member adapted to be temporarily mounted to the inside surface of the rear window for defining a straight edge for the base of the heating conductor applicator. The guide member comprises an elongated central section two opposite wing sections slidably mounted to the opposite ends of the central section, means for securing each wing section to the central section with the wing sections in alignment with the central section to present a continuous straight edge defined by one edge of the central section extended by the corresponding edges of the wing sections. The guide member may comprise ruler means adjustably secured to each opposite end of the central section and extending transversely thereof to permit positioning of the guide member a predetermined distance from the base line of the rear window but parallel thereto. The central section of the guide member may comprise a plurality of spaced apart securing pads for retaining the guide member to the inside surface of the rear window, each pad comprising a foot member retained to the opposite edge of the central section and a layer of adhesive secured to each foot member for contacting the inside surface of the rear window.

Each wing section may comprise at least one longitudinally extending pointed pin projecting outwardly from the free end of each wing section.

Other features will become apparent from the following detailed description of different embodiments of the invention.

BRIEF DESCRIPTION OF THE DRAWINGS

Other features of the invention will be described below.

Examplary embodiments of this invention will now be described with particular reference to the attached drawings wherein.

DETAILED DESCRIPTION OF PREFERRED EMBODIMENTS OF THE INVENTION

Figure 1:
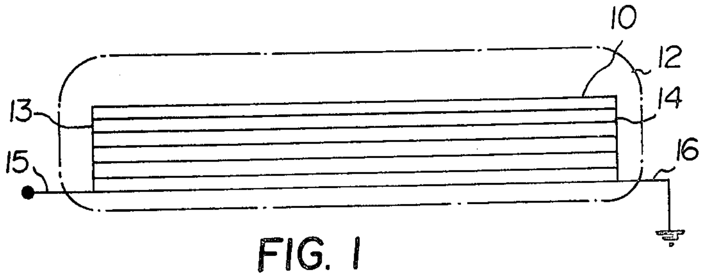
FIG. 1 shows a patter of heating conductors with transversaly extending connecting conductors disposed over the middle region of a rear window as more fully disclosed in said U.S. Pat. No. 4,065,848.

With particular reference to FIG. 1 a pattern of conductor lines 10 is secured to the inside surface of a car's rear window (shown by phantom line 12) in a motor vehicle, and the pattern consists of a plurality of parallel spaced apart heating lines or conductors 10 interconnected by means of connecting conductors 13 and 14 from which leads 15 and 16 extend which are used to connect the defroster to the electrical power circuit (not shown) of the car. Each heating conductor 10 or connecting conductor 13 and 14 consists of a strip of solid copper or copper alloy of uniform cross-section whose width greatly exceeds its thickness. One wide surface of the strip is covered with a layer of suitable thermosetting adhesive to be applied to the inside surface of the rear window 12. Each conductor is secured to the rear window by application of heat and pressure which softens the layer of adhesive and ensures a permanent bond. A commercially available and suitable pre-glued copper conductor is sold by Circuit-Stick Corporation under the expression "pressure sensitive copper tape" and it measures 60 thousandths of an inch by 1.4 thousandths of an inch with a layer of adhesive measuring about 2 thousandths of an inch thick extending the full width of the tape and covered by a protective film which must be peeled off before application. This product is identified under No. SPN 1053 and is used primarily in the construction of prototype circuit boards in the electronic field.

The methods of installation of resistive defrosters to be described hereinafter are adapted to be carried out without having to remove the rear window from the assembled motor vehicle.

The operator must first determine the resistance of the conductor network and then the area of the rear window to be covered by the pattern. Depending on the dimensions of the area to be defrosted he will select the number of parallel heating conductors 10 to be installed and tables or charts may easily be prepared for this purpose. The distance between successive heating conductors 10 is relatively fixed. In practice it will be about 1 and $\frac{1}{8}$ of an inch plus or minus $\frac{1}{8}$ of an inch. Otherwise loss of energy or improper defrosting may result.

Figure 2:
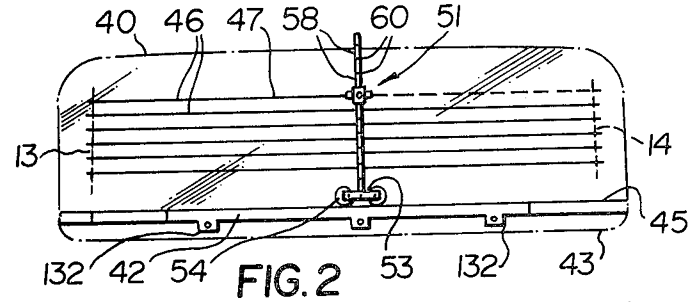
FIG. 2 illustrates the method of applying the heating conductors to the inside surface of a rear window using a guide member and a carrier in accordance with this invention.
Figure 5:
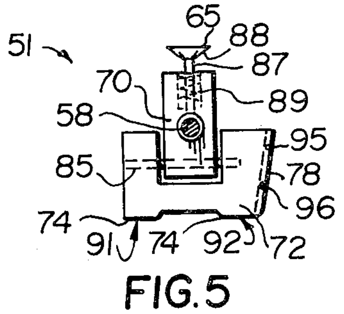
FIG. 5 shows a different simplified embodiment of a carrier head wherein the locking means is a spring loaded retractable pin.

FIG. 2 illustrates in phantom line a rear window 40 to which a guide member 42 has been temporarily secured toward the lower edge 43 of window 40. Guide member 42 presents an upper straight edge 45 which is parallel to the lowest edge 43 of window 40. A carrier is used for applying six successive heating conductors 46. The upper conductor 47 is shown as being only partially installed; its preliminary installation will be completed by running the carrier or applicator as far as it will go toward the right-hand edge of window 40. The carrier comprises a head 51, a base 53 that includes a cross-bar and two spaced apart wheels 54 which are adapted to roll along the straight edge 45 of guide member 42. An upright shaft 58 which is best shown in FIG. 5 extends upwardly from base 53. Shaft 58 is essentially straight, of constant cross-section and has a plurality of equally spaced apart index marks 60 along its length. In practice numerous shafts 58 of different lengths should be available to the operator, and one or more could be slightly curved in order to better conform to the shape of certain rear windows and not interfere with the upper moulding (not shown) of window 40. Shaft 58 supports head portion 51 which comprises a locking means 65 for releasably securing head 51 to shaft 58 at predetermined positions along shaft 58 corresponding to index marks 60.

Figure 11:
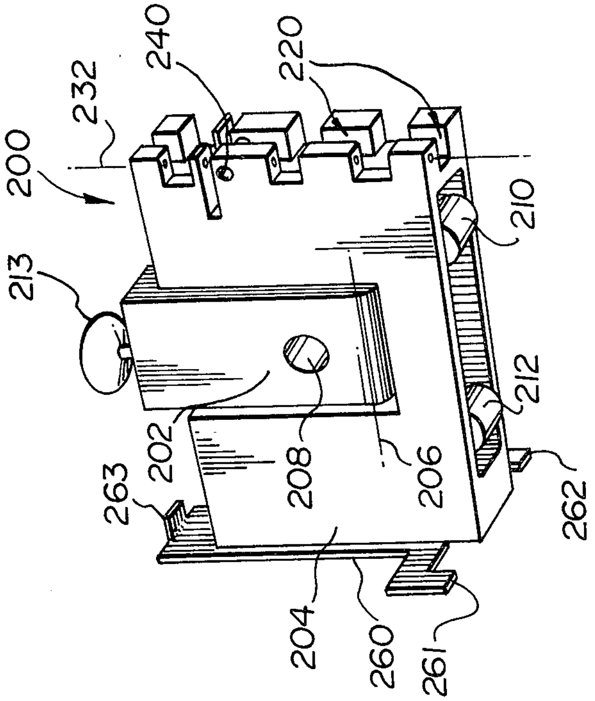
FIG. 11 is a perspective view of a third embodiment of the head portion of a carrier in accordance with this invention but wherein the groove cover has been removed in order to simplify the illustration.
Figure 13:
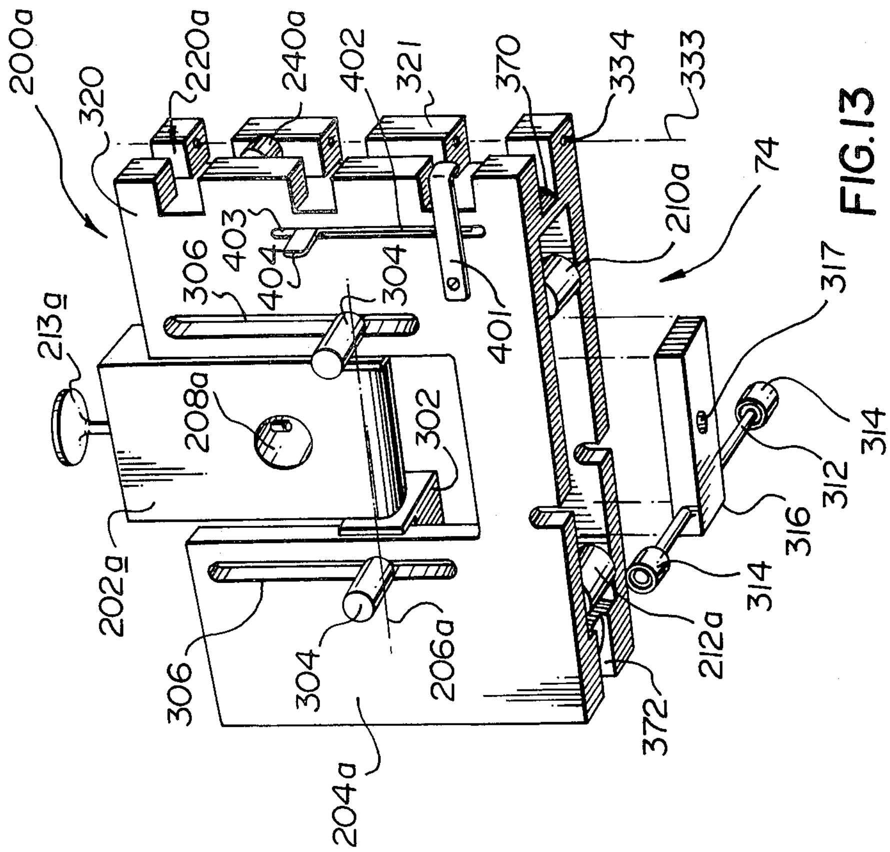
FIG. 13 is a perspective view of a fourth embodiment of the head portion of a carrier wherein the groove cover has been omitted in order to simplify the illustration.

Preferably shaft 58 is of circular cross-section and each index mark 60 is defined by a transverse groove of uniform depth especially when used in association with the heads illustrated in FIGS. 5, 11 and 13.

Figure 4:
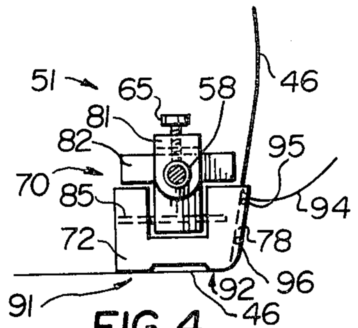
FIG. 4 is a plan view of one embodiment of the head of a carrier wherein the locking means is in the form of a set screw.
Figure 3:
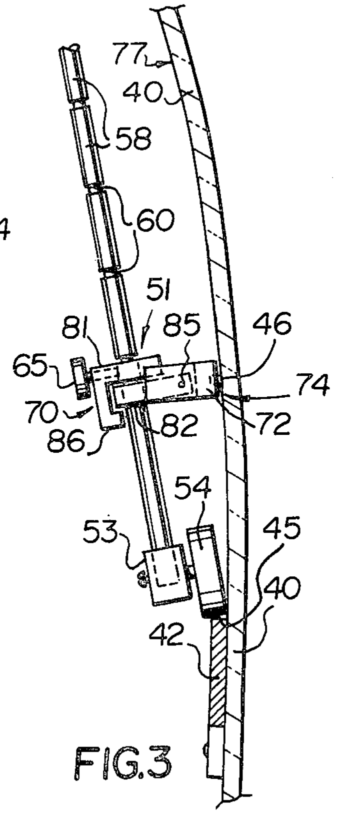
FIG. 3 is an enlarged side elevational view of a carrier shown with its base in contact with the guide member temporarily secured to the rear window (see in cross-section)

Head or conductor applicator 51 comprises a coupling 70 as shown in FIGS. 3, 4 and 5 through which shaft 58 projects. Head 51 also comprises a window engaging member 72 which has a sufficiently wide and long pressure surface 74 for pressing the pre-glued strip of copper 46 against the inside surface 77 of rear window 40. The width of surface 77 assures that head 51 will always ride over strip 46. The length of surface 74 should be sufficient to prevent pivoting of head 51 about shaft 58 during application of a conductor. The window engaging member 72 also has a groove 78 for receiving the strip and guiding same towards the pressure surface 74 and the surface of the rear window. Pins 95 and 96 maintain the strip into groove 78.

As shown in FIGS. 3 and 4 coupling 70 can be made of two parts where the locking member 65 is a set screw. In this arrangement the coupling comprises a first component 81 carrying the set screw 65 and having an aperture for receiving shaft 58. The second component 82 projects from the first component 81 toward the window contacting element 72 to which it is pivotally connected by pin 85. In use, pin 85 is essentially parallel to guide member 42 and to the rear window 40. The first component 81 is fixedly secured to shaft 58 by means of set screw 65 but the second component 82 is free to rotate slightly about shaft 58 and is retained at a given position therealong by means of a projection 86 located on the lower portion of first member 81 as best seen in FIG. 3. This combination results in a universal pivotal connection (within acceptable limits) of the window engaging element 72 relative to shaft 58 and this is important in order to ensure that the window engaging surface 74 will easily follow the transverse curvature of window 40 throughout each application of a heating conductor 46.

In the embodiment of FIG. 5 coupling 70 is made of only one component pivotally connected to the window engaging member 72 by means of pin 85 and its locking member 65 consists of a slidable pin 87 having a head portion 88 and a cylindrical projection which is adapted to fit into any one of grooves 60 along shaft 58. A coil spring 89 biases locking means 65 inwardly so as to maintain the inner projection of the slidable pin 87 into one of grooves 60. Coupling 70 is therefore freely pivotable about shaft 58 which provides the necessary universal freedom to window engaging element 72, and its position therealong can be changed. If it is desired to limit the pivotal motion of head 72 around shaft 58 grooves 60 could be made to extend only partially around shaft 58, for example 90 degrees.

The two different applicators shown in FIGS. 4 and 5 comprise a pair of spaced apart feet 91 and 92 which run over strip 46 when being applied to window 40. The presence of two spaced apart contact means 91 and 92 at pressure surface 74 instead of only one permits the operator to maintain surface 74 parallel to window 40. As a result, the pressure applied to strip 46 is more uniform throughout its length, there is a natural tendency of the unfolding strip 46 to lie flat and in a straight line on window 40 and there is less danger of pressure concentration which could give rise to excessive friction between strip 46 and surface 74.

As noted above, the pre-glued strip of copper 46 is threaded inside groove 78. It is then pulled through sufficiently to run along pressure surface 74 and along the side of head 72 which is opposite groove 78. With reference to FIG. 2, the application of each heating conductor 46 would begin from the left-hand side region of the rear window 40 and then the carrier will be slowly moved to the right with some pressure being applied to the head portion 51 so as to cause initial adhesion of the strip to the inside surface 77 of window 40. Pre-glued strip 46 has a protective film 94 (over its layer of adhesive) which must be removed immediately prior to application. To this effect first guide pin 95 extends across groove 78 a slight distance from the bottom thereof. The function of pin 95 is to retain the copper strip 46 inside the groove and to separate the protective film 94 from the layer of adhesive on strip 46. Second pin 96, a short distance away from the first pin 95, maintains strip 46 inside groove 78 to ensure that strip 46 reaches pressure surface 74 in proper alignment.

In operation, when it is desired to install a preselected number of heating conductors to the inside surface 77 of a rear window such as at 40 in FIG. 2, the operator installs a guide member 42 as close as possible to the lowest edge of window 40 after having thoroughly cleaned the inside surface 77. In certain motor vehicles it is not essential to use a guide member 42 because the pre-existing moulding (not shown) is sufficiently straight and presents a satisfactory guiding edge for guiding the carrier. Then the operator locks head 51 to shaft 58 at the selected groove or index marks 60 and then starting from one end of the rear window he applies a first heating conductor. The installation of each heating conductor comprises the steps of threading a strip of pre-glued copper 46 through groove 78 in the head of the carrier and extending the projected end of the strip 46 across the full length of the pressure surface 74 and beyond it while peeling the protective film 94 just above pin 95; then making initial contact of strip 46 with the inside surface 77 of window 40 starting at one extremity of the window, for example as far left as possible. With a gradual motion the operator moves the carrier along the guiding edge 45 all the way across the inside surface 77 to the right-hand side edge of window 40 maintaining an even pressure over head 51 and permitting strip 46 to pass through groove 78 and remain secured to surface 77. Before cutting strip 46 with cuttling pliers or scissors a few extra inches or strip 46 are run through groove 72 to prevent rethreading. For each successive heating conductor 46 the operation involves resetting head 51 to the next following index mark 60, making initial application starting from the left-hand side of window 40 and then moving the applicator or carrier along the surface maintaining an even pressure over head 51 and keeping wheels 54 of base 53 in constant contact with straight edge 45.

Having applied the required number of heating conductors 46 the operator will then apply two connecting conductors, as at 13 and 14 in FIG. 2, which will overlie the extreme portions of the heating conductors 46. Connecting conductors 13 and 14, which may be wider than the heating conductors should be located as close as possible to the opposite edges of window 40 and in fact where it is practical to do so the inside mouldings (not shown) of window 40 will have been removed prior to the installation of the conductors so that the connecting conductors 13 and 14 lie behind such mouldings.

Where it is desired to make a series-parallel circuit, sections of the connecting conductors 13 and 14 will be removed by using a sharp blade for cutting completely through strips 13 and 14.

The next operation involves heating of each conductor 46, 13 and 14 by using a heating device. A particularly suitable heating device is a soldering gun having a relatively long heating bar (not shown) pivotally mounted at its central region to the tip of the gun. The length of the heating bar should be sufficient to contact two successive heating conductors 10. The bar should be made of copper or aluminium for conducting heat from the tip to conductors 10. A heating gun of the 35 to 50 watt pencil type has been found adequate. This operation softens the adhesive and with a slight uniform pressure a permanent intimate bond with window 40 is obtained.

Soldering is effected by applying solder in cream form over each conductor cross point and then folding the free end of each heating conductor over the associated connecting conductor 13 or 14. A heating conductor overlap of about $\frac{3}{4}$ of an inch should be sufficient. Then the excess length of heating conductors 46 should be cut with sharp scissors or cutting pliers. Then heat and very slight pressure is applied over each cross point sufficiently to completely melt the soldering cream and ensure a good electrical connection. Soldering cream has been found satisfactory in making good electrical connections but care must be taken to ensure that enough soldering material will remain between the mating surfaces during heating. Obviously, solder in solid form could be used as a substitute for soldering cream especially where a less resistive connection is required. The quality of the connections at the cross points should be verified by measuring the resistance of the pattern or of each subcircuit with a simple ohmmeter and all defective connections should be reheated.

Figures 6, 7, 8, 9, 10:
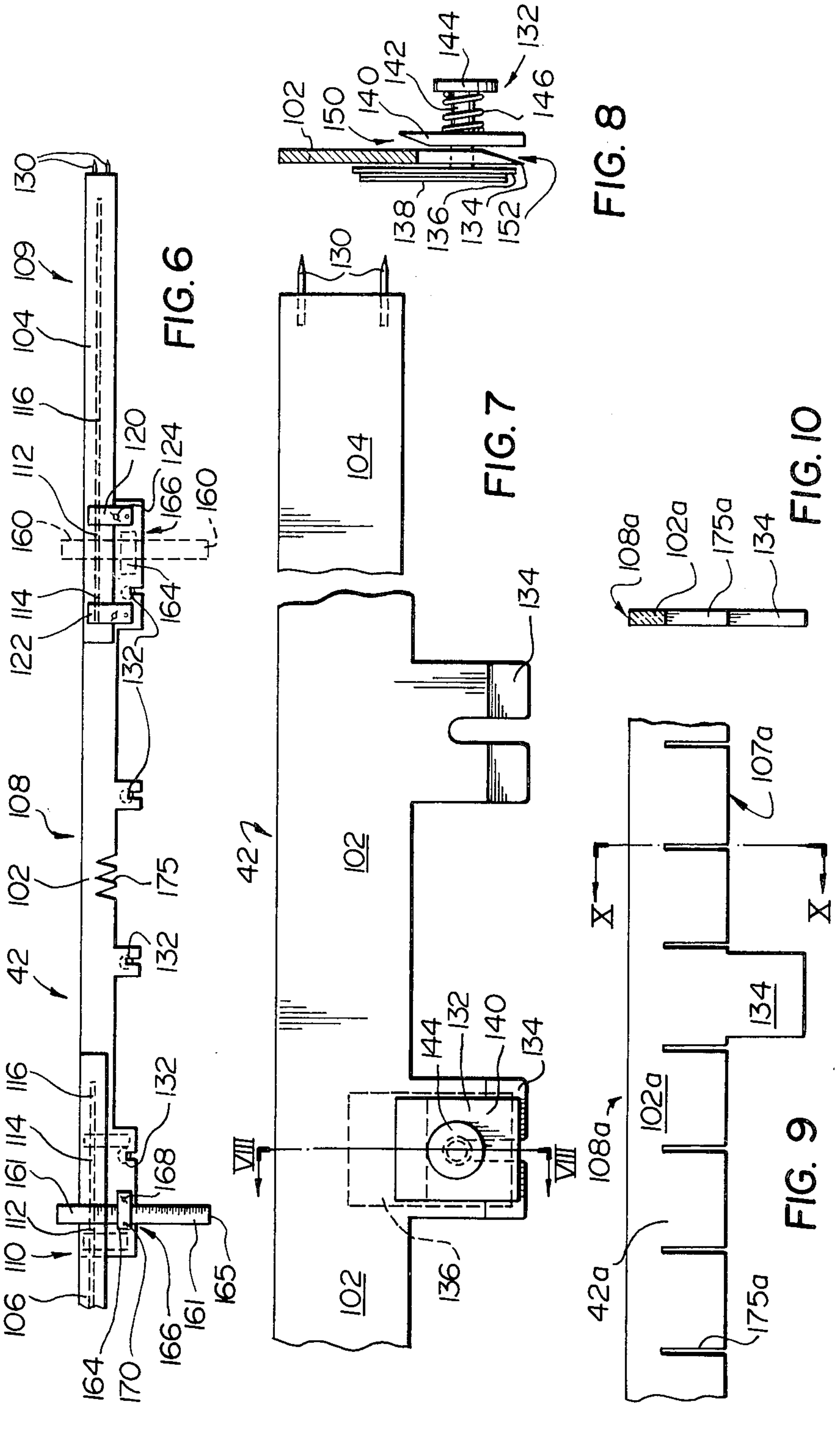
FIG. 6 is a plan view of a guide member.
FIG. 7 is an enlarged plan view of a portion of a guide member shown in FIG. 6.
FIG. 8 is a cross-sectional view taken along line VIII—VIII of FIG. 7.
FIG. 9 is a plan view of a portion of a different guide member which may be used to define a curved edge.
FIG. 10 is a cross-sectional view taken along line X—X of FIG. 9.

In FIGS. 6, 7 and 8 guide member 42 comprises an elongated main section 102, two opposite wing sections 104 and 106 slidably mounted in overlapping relationship to the opposite ends of the central section 102, and means for securing each wing section 104, 106 to the central section 102. One edge 108 of the main or central section defines a straight edge which is extended by the corresponding edges 109 and 110 of the respective wing sections 104, 106 and therefore the securing means must maintain the wing sections 104 and 106 in good alignment with the central section 102. To this effect the central section 102 carries two spaced apart pins 112 and 114 which project a short distance beyond one surface of central section 102 to ride into a groove 116 in the corresponding wing section 104 or 106. The securing means also comprises for each wing section 104,106 a pair of spaced apart clamping members 120 and 122 with tightening means 124 comprising a wing nut on a small screw for manually urging the clamping members 120 or 122 towards the underlying portion of the central section 102. Thus when the wing nuts are tightened sufficiently the associated wing section 104 or 106 is sufficiently securely retained in alignment with the central section 102. As best illustrated in FIG. 6 the central section 102 comprises two securing means for the wing sections 104 and 106, one at each end of the central section 102 but in FIG. 8 only one securing means is shown in details. Of course in some applications only one wing section will be required.

As shown in FIGS. 6 and 7 the free end of each wing section 104, 106 comprises at least one pointed pin 130 and preferably two such pins 130 will be used as shown in FIGS. 6 and 7. The purpose of pin 130 is to project into and consequently engage with the resilient or soft material which is usually found bordering the side edges of the inside surface of a motor vehicle's rear window. The main or central section 102 also requires retaining means for temporarily holding central section 102 to the inside surface of the rear window during installation of a defroster. To this effect two or more spaced apart securing pads 132 are mounted to slotted extensions 134 of the central section 102, each pad comprising a foot member 136 and a layer of adhesive 138 under foot member 136. As best seen in FIGS. 7 and 8 each securing pad 132 also comprises an upper clamping member 140 through which projects shaft 142 secured to foot member 136 and having an enlarged head 144 whose purpose is to retain a coil spring 146 in compression for urging clamping member 140 towards foot member 136. Thus each covering pad 132 is frictionnally retained to the edge of central section 102 which is opposite to the straight edge 108 thereof. Engagement of the securing pads 132 with the extensions 134 of central section 102 will be facilitated by undercutting at an angle the leading edge of clamping member 140 as at 150 in FIG. 8 and by also grinding the leading edge of each projection 134 in a slope or ramp as at 152. In an alternative embodiment the clamping member 140, shaft 142, spring 146 and foot member 136 are omitted and a layer of self adhesive is directly applied to each projection 134 to provide a simplified securing means. The inner surface of the self-adhesive adheres to the surface of the rear window. When the adhering forces become insufficient, such as after three or four applications, the layer of adhesive on projection 134 is replaced by a fresh layer of adhesive. It is also within the scope of this invention to replace the adhesive with pieces of rubber and rely on two or three spaced apart knee action legs (not shown) which are pivoted to guide member 42 and have at their free end a rubber foot which bears against the shelf found behind the rear seat in most cars.

With reference to FIG. 6, parallel positioning of the central section 102 to the base of the window may be facilitated by the use of two spaced apart ruler means 160 and 161 which are adjustably secured to each opposite end of the central section 102 and which extend transversely thereof. A clamping member 164 may be used for retaining each ruler means 160,161 with their respective lower end 165 a given distance below the lowest edge 166 of the adjacent widened portion of central section 102. To this effect clamping member 164 may be tightened by means of a screw and wing-nut arrangement 168 at one end with a suitable fastener such as a rivet or bolt retaining the opposite ends as at 170.

In certain applications it may be necessary to bend straight edge 108 at its middle point to better conform to the shape of certain rear window made of 2 glass panes glued together along their mating edges which are located in a longitudinal plane in the middle of the rear window. In order to permit bending of the guide member, the middle region of the central section 102 may comprise one or more V-shaped slots 175 opening on the edge opposite guiding edge 108 and extending about half way into central section 102.

In an alternative embodiment shown in FIGS. 9 and 10 the guide member **42*a* comprises a main or central section 102*a* which is similar to main section 102 shown in FIG. 6 except that it has along its entire length a series of similar equally spaced apart slots 175*a* extending perpendicularly from the lower edge 107*a* of guide member 42*a* to about two thirds of its height. The wing sections such as at 104 in FIG. 6 may likewise be provided with series of slots along their entire length. This arrangement affords controlled flexibility to the guide member 42*a* in its longitudinal plane i.e. in directions parallel to the rear window 40 seen in FIG. 3. Since the flexibility of guide member 42*a* is uniform throughout its length it becomes relatively easy to bend it and apply it against the inside surface 77 of a rear window 40 which is curved and slanted, in such a manner as to present a guiding edge 108*a* which follows the lower edge of the rear window. Uniform flexibility of guide member 42*a* is obtained when the strip of plastic material used for making main section 102*a* is of constant cross-section and the slots 175*a*** are equally spaced apart are of even depth into the strip of plastic material and when there are such slots along the entire length of the strip.

In practice we have found that the guide member 42 or **42*a* should be made of fairly rigid plastic material and the width of the central section 102 or 102*a* and of wing sections 104 and 106 may be of the order of one inch while their thickness may be about $\frac{1}{8}$ of an inch. In order to keep sufficient rigidity in the wing sections 104,106 the depth of groove 116 should be less than the thickness of the wing sections. Moreover when slots such as at 175*a* are provided in the wing sections (not shown) groove 116 is disposed closer to the upper edge 109 thereof in order to ensure that slots 175*a* do not reach groove 116. One particular plastic material found suitable for making guide member 42 or 42*a*** is that sold under the trademark LEXAN.

Figure 12:
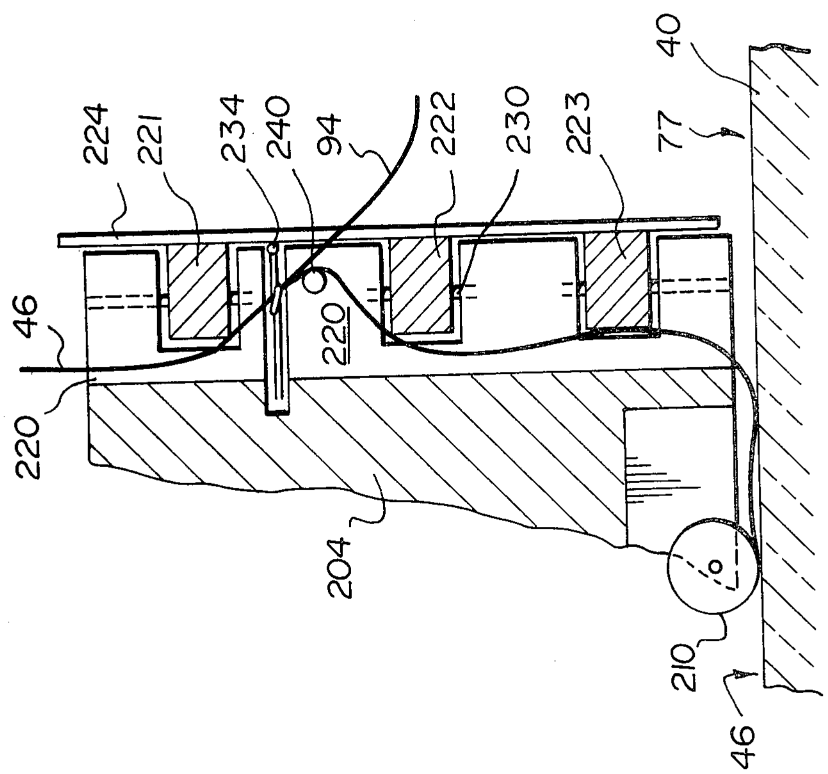
FIG. 12 is a partial cross-sectional view in enlarged scale of the embodiment shown in FIG. 11 and taken in the median plane of the head of FIG. 11, showing the groove cover in place.

In FIGS. 11 and 12 a different embodiment of the head portion 200 of an applicator or carrier is shown which is designed to be used in conjunction with the base 53 and the upright shaft 58 shown in FIGS. 2 and 3. Carrier 200 comprises a coupling 202 to which window engaging member 204 is pivotally connected along axis 206. Cylindrical bore 208 is adapted to receive upright shaft 58 and it comprises a spring biased locking means 213 which is essentially similar to locking means 65 illustrated in FIG. 5.

Figure 16:
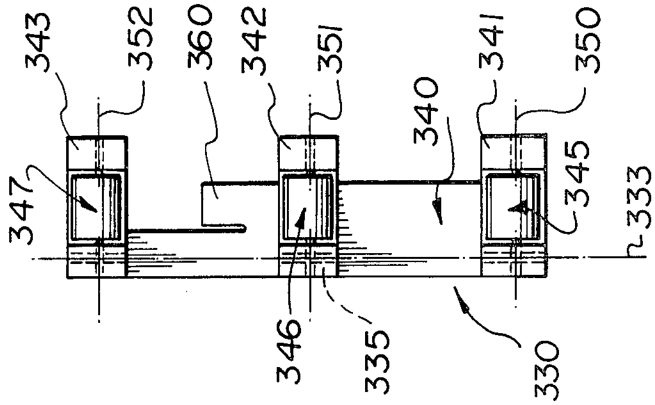
FIG. 16 is a rear view of the groove cover.
Figure 15:
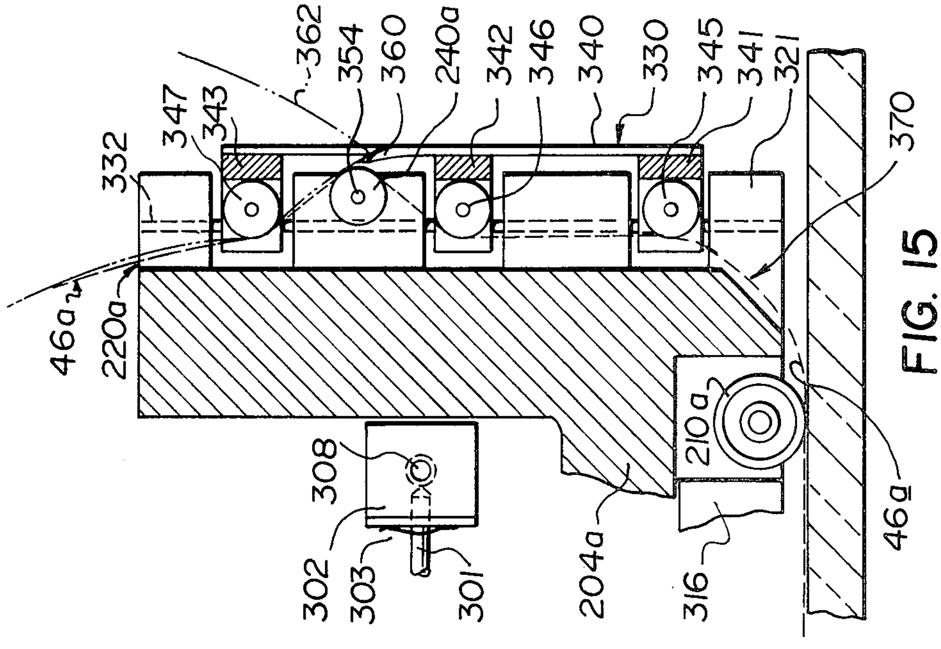
FIG. 15 is a partial cross-sectional view in enlarged scale of the head shown in FIG. 13 taken in the median plane of the head and showing the groove cover also in cross-section.

However instead of pins 95 and 96 as shown in FIGS. 4 and 5 at least two spaced apart covering members 221, 222 and 223 are provided which, as shown in FIG. 12 are interconnected together by a bar 224 thus forming a groove cover which is pivotally connected to the adjacent portions of window engaging member 204 by a longitudinal pin 230 which extends along axis 232. A small coil spring 234 having its single coil around pin 230 urges bar 224 outwardly so as to move the groove cover 221 to 224 out of groove 220 permitting insertion of strip 46 into groove 220. A simple locking device or latch similar to that which will be described below in conjunction with FIGS. 15 and 16, is used to counteract the action of coil spring 234 and keep groove cover 224 closed over strip 46 into groove 220 during application of strip 46. In order to simplify the illustration of this embodiment, covering members 221, 222, 223 and bar 224 have been omitted from FIG. 11.

Transversaly extending pin 240 forces strip 46 to pass from under covering member 221, over pin 240 and thence under covering member 222. This curved path over pin 240 causes separation of protective film 94 from the layer of adhesive on strip 46. If it is that excessive friction develops between any of covering members 221, 222, or 223 and the pre-glued surface of strip 46, a small roller (as will be described below in association with FIGS. 13 to 16) should be provided on the interfering covering member. Such a roller would be freely rotatable about an axis parallel to pin 240.

Initial positioning of the window engaging member 204 at the starting point of each heating conductor substantially perpendicularly to the inside surface 77 of window 40 is greatly facilitated by the use of a retractable fork member 260 having two spaced apart legs 261 and 262 whose extremeties are always parallel to the parallel spaced apart axes of rollers 210 and 212. For making initial contact of strip 46 with the inside surface 77 of window 40, the operator pushes the upper tab 263 of fork member 260 downwardly thereby extending legs 261 and 262 beyond the plane that contains the contact areas defined by rollers 210 and 212. Once legs 261 and 262 are in contact with the glass surface 77 at the proper level thereon, the operator further presses the window engaging member 204 against the glass surface 77 which causes the starting portion of strip 46 to come in contact with glass surface 77 at the proper position. Then fork member 260 can be retracted and the operator moves carrier 200 transversely of the rear window 40 to apply the corresponding heating conductor. Retraction of fork member 260 may be facilitated by using a return spring (not shown) urging fork member 260 to the retracted position and a lock (not shown) could be provided in order to maintain leg 261, 262 extended until initial contact of strip 64 with window 40.

FIGS. 13 to 16 illustrate a fourth embodiment of the strip applicator embodiment of a carrier head 200*a* is of this invention. This embodiment is designed to be used by those who are called upon to install a large number of defrosters every working day. It is more complex and expensive to make but its use is so smooth and simple that it reduces the time for applying the heating conductors in a car from about 10 to 20 minutes (when using the head of FIG. 5) to a mere two minutes depending on the experience of the operator, and it requires less dexterity. Head 200*a* is basically similar to head 200 shown in FIGS. 11 and 12. However it comprises a coupling 202*a* to which window engaging member 204*a* is pivotally connected along a translatable axis 206*a* by means of pin 301 (see FIG. 15) retained to member 204*a* by two spaced apart blocks 302 and spring washers 303. Each block 302 is retained to window engaging member 204*a* by means of a screw 304 which extends through an elongated slot 306 into a threaded hole 308 in block 302. With both screws loosened, the position of coupling 202*a* may be varied with respect to window engaging member 204*a*. Thus the operator is able to adjust the distance between the bore 208*a* for stem 58 and the window engaging rollers 210*a* and 212*a* which is particularly useful in the case of many rear windows designs. For example, when applying the lower conductors the shortest distance between hole 208*a* and pressure surface 74 is the required setting (as can be gathered from looking at FIG. 3) but as the head 202*a* is move to higher index marks 60 on shaft 58 a longer distance between hole 208*a* and pressure surface 74 is necessary in order to go as far as possible toward the side edges of window 40 without interference between shaft 58 and the surrounding window mouldings.

The guiding fork 260 shown in FIG. 11 is advantageously replaced by a cross-shaft 312 which carries a free roller 314 at each end. Cross-shaft 312 is retained in position to the underside of window engaging member 204*a* by means of a small block 316 which fits into the space comprised between pressure rollers 210*a* and 212*a*. A screw (not shown) extends through bore 317 in block 316 into a threaded hole (not shown) in member 204*a*. Cross-shaft 312 is parallel to the parallel axes of pressure rollers 210*a* and 212*a*, it is longer than the width of member 204*a* and its position is such that rollers 314 are essentially in the same plane as pressure rollers 210*a* and 212*a* or just slightly below them so that when rollers 210*a* and 212*a* roll along strip 46 free rollers 314 just barely touch the inside surface of window 40. In addition, it should be possible to remove shaft 312 and block 316 from member 204*a* in order to be able to apply a conductor quite close to the lower edge of the rear window. The distance between rollers 314 should be sufficient to provide good lateral support. In practice this distance may be the same as that between the axes of rollers 210*a* and 212*a*.

Leading groove 220*a* runs along one side of window engaging member 204*a* from the top edge thereof to the pressure surface 74 of head 200*a*. This groove is designed to receive the pre-glued strip of conductor 46*a* shown in FIG. 15. Groove 220*a* is defined by parallel walls 320 and 321 of window engaging member 204*a*. Leading groove 220*a* may be advantageously rounded or extended at an angle by corner groove 370 in order to reduce the friction between window engaging member 204*a* and strip 46*a* at that point.

Figure 14:
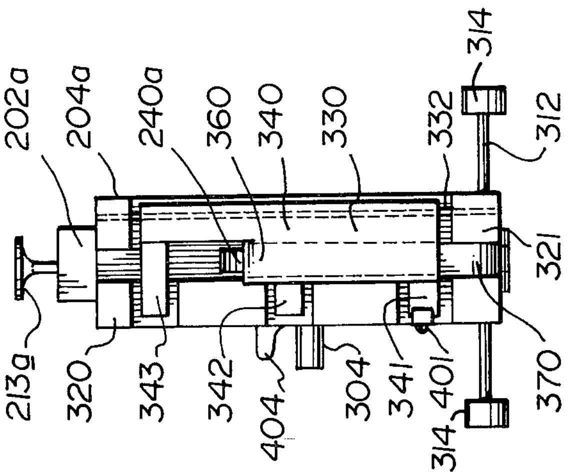
FIG. 14 is an end view of the head of FIG. 13 with its groove cover in place.

A groove cover 330 is shown in FIGS. 14 to 16 but it has been omitted from FIG. 13 in order to simplify the illustration. Groove cover 330 is designed to be mounted to window engaging member 204*a* in such a manner as to overly groove 220*a* when in the closed position but giving free access to said groove when in the open position. In effect, assembly 330 is pivotally connected to window engaging member 204*a* by means of an elongated pin 332 extending along axis 333 into aligned bores 334 in wall 321 of member 204*a* and into aligned bores 335 in assembly 330. Similar means (not shown) for spring loading assembly 330 toward the open position and for locking same in the closed position as were described in connection with FIGS. 11 and 12 should be used in association with assembly 330.

Assembly 330 comprises a connecting member 340 to which three spaced apart covering members 341, 342, 343 are secured, each of which carrying a transversely extending roller 345, 346, 347 freely mounted to pivot pins on axes 350, 351, 352. An other roller, shown at 240*a* in FIGS. 13, 14 and 15 is mounted for free rotation about axis 354 which is parallel to axes 350 to 352 but extending across walls 320, 321 of member 204*a*. Roller 240*a* in effect corresponds to pin 240 shown in FIG. 12.

The portion of connecting member 340 disposed directly above roller 240*a* defines a tangentially extending blade 360 whose leading edge is spaced from roller 240*a* just sufficiently to allow passage therebetween of pre-glued strip 46*a* but without the protective film 362. Blade 360 causes film 362 to separate from the layer of adhesive and to travel in a different direction as best seen in FIG. 15. If necessary a small deflecting blade (not shown) could be secured to the outer surface of blade 360 by projecting beyond and away from roller 354. In effect, therefore, the gap between roller 240*a* and blade 360 is adjusted to be slightly longer than the thickness of strip 46*a* without film 362 but less than the thickness of strip 46*a* with protective film 362 in place thereon. Separation of the film 362 from strip 46*a* is greatly facilitated due to the fact that strip 46*a* with its protective film 362 is forced to make a relatively sharp bend as it comes from under roller 347 to proceed over roller 240*a*.

As noted above leading groove 220*a* is extended to pressure surface 74 by means of a corner groove 370 which reduces friction and insures that strip 46*a* will remain in the center of pressure surface 74. At the trailing end of pressure surface 74 a sloping groove 372 (see FIG. 13) is provided which is useful to properly align the strip 46 with the longitudinal axis of head 220*a* especially when making initial contact with the rear window at the beginning of every conductor.

Pressure surface 74 is defined by two spaced apart free rollers 210*a* and 212*a* which correspond to rollers 210 and 212 of FIG. 11. Likewise, retractable pin 213*a* corresponds to pin 213 of FIG. 11.

Rollers 240*a*, 345 to 347, 210*a* and 212*a* are at least as wide as strip 46 in order to provide proper engagement with strip 46 and prevent its twisting. In practice rollers 210*a* and 212*a* are wider than strip 46.

In order to maintain groove cover 330 in its closed position a small spring loaded catch 401 is provided adjacent the free edge of groove cover 330. Catch 401 is a small leaf spring secured to head 200*a* by means of a metal screw and the other end of the leaf spring is bent at right angle in order to overlie the adjacent corner of groove cover 330 when same is moved to its closed position. A centrally pivoted bar 402 is received in a sufficiently deep slot 403 in head 200*a* with one end located underneath the center of leaf spring 401 while its other end projects out of slot 403 to form an actuator 404 which the operator depresses with one finger to release the groove cover 330.

In practice it has been found that the use of the embodiment of FIGS. 13 to 16 permits the installation of heating conductors in such a short period of time that the other operations such as cleaning the window, making the electrical connections etc. now take the majority of the total time required for installing a rear window defroster in a car. The use of two spaced apart pressure rollers 210*a* and 212*a* enables the operator to apply a significant force to head 200*a* in a direction normal to rear window 40 without increasing the friction between strip 46 and head 200*a*. Thus it becomes relatively easy to apply a conductor on a rear window by holding head 200*a* with one hand and making one continuous motion across the rear window at a constant speed. Lateral stabilisation of head 200*a* is greatly enhanced by the action of lateral rollers 314 which remain in contact with the surface of the rear window throughout each application.

In a suitable physical embodiment of head 200*a* the distance between the axes of rollers 210*a* and 212*a* was one inch, and the distance between the outer edges of rollers 314 was also one inch.

I claim:

1. Apparatus for applying pre-glued conductors in strip form onto the inside surface of a rear window in a motor car thereby to provide a series of parallel, equally spaced apart heating conductors extending transversaly of said rear window and adapted for defrosting said rear window, said apparatus comprising a guide member presenting a straight edge and having means for temporarily securing said guide member adjacent and parallel to the lower edge of said rear window, said apparatus also comprising a carrier consisting of a base, an upright shaft extending upwardly from said base, and a head releasably mounted to said shaft, said base comprising a cross-bar extending perpendicularly to said shaft and two spaced apart wheels, one at each end of said cross-bar with said wheels extending below the lower edge of said cross-bar in order to be able to roll along said straight edge while maintaining said shaft perpendicular to said straight edge, said shaft being essentially straight of constant cross-section and having a plurality of equally spaced apart index marks along its length, said head having locking means for releasably constraining same against displacement along said shaft, said head also comprising a coupling through which said shaft projects and a window engaging member pivotally supported on said coupling about a first axis which is essentially perpendicular to the length of said shaft, said coupling allowing at least some degree of rotation of said window engaging member about said shaft, said window engaging member having a pressure surface parallel to said first axis, and a groove leading toward one end of said pressure surface, said groove receiving and guiding said pre-glued strip of conductor toward said rear window and toward said pressure surface, said window engaging member also having means extending across said groove a short distance above the bottom of said groove which distance is just sufficient to allow free running of said pre-glued strip of conductor along said groove, said pressure surface comprising two spaced apart contact means adapted to run over said strip of conductor during application thereof.

2. Apparatus as defined in claim 1 wherein said guide member comprises an elongated central section, two opposite wing sections slidably mounted to the opposite ends of the central section with the wing sections in alignment with the central section thereby to present a continuous straight edge defined by one edge of said central section extended by the corresponding edges of said wing sections.

3. Apparatus as defined in claim 2 wherein said guide member also comprises first and second ruler means adjustably secured to each opposite end of said central section and extending transversely thereof thereby to permit positioning of said guide member parallel to but spaced from a base line.

4. Apparatus as defined in claim 2 wherein said central section comprises a plurality of spaced apart securing means for retaining said guide member to said inside surface, each securing means comprising a foot member retained to the edge of said central section which is opposite said straight edge.

5. Apparatus as defined in claim 2 wherein each wing section comprises at least one longitudinally extending pointed pin projecting outwardly from the free end of each wing section.

6. Apparatus as defined in claim 1 wherein said shaft is of circular cross-section, wherein each index mark consists of an annular groove around said shaft, wherein said locking means for said head comprises a retractable pin biased toward said shaft and adapted to project into said annular groove, and wherein said means extending across said groove comprises a transverse pin which is close enough to the bottom wall of said groove to remove from said layer of adhesive a protective film.

7. Apparatus as defined in claim 6 wherein said window engaging member comprises a retractable fork member having two spaced apart window contacting legs whose extremeties are on a line which is parallel to the plane that contains said two contact means.

8. Apparatus as defined in 7 wherein said contact means as defined by two small rollers rotatably mounted to said window engaging member around two parallel spaced apart axes which are parallel to said line.

9. Apparatus as defined in claim 8 wherein said window engaging member also comprises a cross-shaft having a free roller at each end thereof and releasably retained to said window engaging member, the position of such cross-shaft being such that in use said last mentioned free rollers are even with or project slightly below said pressure surface whereby they barely touch the rear window when applying a conductor strip, and the distance between said free rollers exceeding the width of said window engaging member to provide lateral support thereto.

10. Apparatus as defined in claim 9 wherein said window engaging member comprises a corner groove for said strip at each end of said pressure surface.

11. Apparatus as defined in claim 1 wherein said groove is relatively deep, wherein said means extending across said groove comprises a protective film separator, at least two covering members disposed into said groove on either sides of said separator and under which said strip passes, and means for removably retaining said covering members into said groove, and wherein said covering members extend deeper into said groove than said separator over which said strip is caused to pass.

12. Apparatus as defined in claim 11 wherein said means for retaining said covering members comprises a bar for interconnecting said covering members together thereby to form a groove cover, a pivotal connection parallel to said groove for connecting said groove cover to said window engaging member, a spring urging said groove cover out of said groove and latch means for retaining said groove cover into said groove against the action of said spring.

13. Apparatus as defined in claim 11 wherein said protective film separator comprises a freely rotatable roller mounted across said groove, said freely rotatable roller being located between said two covering members but further away from the bottom thereof whereby said strip is forced to make a sharp bend as it passes over said freely rotatable roller coming from under one of said covering members.

14. Apparatus as defined in claim 13 wherein both covering members carry an inner roller which is freely rotatable around an axis transverse to said groove and so located relative to the bottom of said groove as to allow said strip to pass between said bottom and said rollers, said protective film separator also comprising blade means mounted to said groove cover and presenting a transverse edge which, when said groove cover is in its closed position, defines with the upper surface of the roller of said protective film separator a gap through which said strip may pass with its protective film removed.

15. Apparatus as defined in claim 1 comprising a corner groove between said groove and said pressure surface.

16. Apparatus as defined in claim 1 comprising means for adjustably varying the distance between said shaft and the pressure surface of said window engaging member, said last mentioned means comprising two spaced apart blocks which carry the opposite ends of a pin which defines said first axis and which extends through said coupling, said window engaging member comprising two spaced apart slots extending perpendicularly to its pressure surface and receiving screws which adjustably support said blocks to said window engaging member.

17. An applicator of pre-glued conductor in strip form for the installation of resistive defrosters on the inside surface of the rear window of a motor vehicle, said applicator comprising a coupling and a window engaging member pivotally mounted to said coupling, said coupling having a transverse bore for receiving a shaft and a retractable spring loaded pin extending into said bore to enter into any one of a plurality or equally spaced apart peripheral grooves on said shaft thereby to pivotally mount said coupling to said shaft, said window engaging member having a pressure surface along one side, a groove along an other side leading toward one end of said pressure surface, the width of said groove being constant and sufficient to receive said conductor with the free wide surface thereof in contact with the bottom wall of said groove and its pre-glued surface facing outwardly of said groove, said window engaging member also comprising a pivotable groove cover having at least two spaced apart covering members projecting into said groove short of the bottom thereof and a protective film separator means disposed between said covering members but spaced outwardly therefrom, said protective film separator means comprising a first freely rotatable roller whose axis extends across said groove and a protective film separating blade disposed tangentially of said first roller and mounted to said groove cover whereby said pre-glued conductor feeding into said groove with its protective film in place passes under the first covering member over said first roller where said blade separates said film from the layer of adhesive on said pre-glued conductor, then under said second covering member, said second covering member comprising a second freely rotatable roller whose axis is parallel to that of said first roller, said second roller being so disposed as to allow said layer of adhesive to roll thereon, said pressure surface comprising a third and a fourth freely rotatable, spaced apart rollers mounted on axes which are parallel to that of said first roller, said third and fourth rollers being wider than said pre-glued conductor.

18. An applicator as defined in claim 17 wherein said window engaging member also comrpises a lateral stabilizer consisting of a cross shaft and fifth and sixth free rollers at the ends thereof, said cross shaft being parallel to the axes of said third and fourth rollers and being considerably longer than the length of said fourth roller.

19. An applicator as defined in claim 17 wherein said window engaging member comrpises a corner groove at each end of said pressure surface, the width of said corner grooves corresponding generally to that of said pre-glued conductor.

20. An applicator as defined in claim 17 wherein the pivotal connection of said window engaging member to said coupling comprises a pin extending freely through said coupling, a pair of spaced apart blocks receiving the ends of said pin, and screw means extending through two elongate spaced apart slots in said window engaging member for adjustably securing said blocks to said window engaging member, said pin extending parallel to said pressure surface and perpendicularly to the axis of said first roller, and said elongate slots being perpendicular to said pin and to the axis of said first roller.

* * * * *